United States Patent [19]

Ogura et al.

[11] Patent Number: 4,913,714

[45] Date of Patent: Apr. 3, 1990

[54] AUTOMOTIVE AIR CONDITIONER

[75] Inventors: Kenji Ogura, Kariya; Takehito Mizutani, Oobu; Kiyoharu Kutsuna, Anjo; Toshio Hirata, Ichinomiya, all of Japan

[73] Assignee: Nippondenso Co., Ltd., Kariya, Japan

[21] Appl. No.: 227,331

[22] Filed: Aug. 2, 1988

[30] Foreign Application Priority Data

Aug. 3, 1987 [JP] Japan .................................. 62-193911
Sep. 1, 1987 [JP] Japan .................................. 62-218547

[51] Int. Cl.$^4$ .............................................. F25B 1/00
[52] U.S. Cl. ........................................ 62/149; 62/114; 62/174; 62/502
[58] Field of Search .................. 62/174, 149, 113, 114, 62/204, 205, 206, 210, 212, 222, 224, 225, 502, 512, 513

[56] References Cited

U.S. PATENT DOCUMENTS

| | | | |
|---|---|---|---|
| 2,794,322 | 6/1957 | Etherington | 62/502 X |
| 2,938,362 | 5/1960 | Schwind | 62/114 X |
| 3,487,653 | 1/1970 | Myre | 62/502 X |
| 4,580,415 | 4/1986 | Sakuma et al. | 62/512 X |
| 4,722,195 | 2/1988 | Suzuki et al. | 62/149 |

Primary Examiner—Harry B. Tanner
Attorney, Agent, or Firm—Cushman, Darby & Cushman

[57] ABSTRACT

The automotive air conditioner uses a plurality of groups of coolant having different boiling points. The air conditioner uses both the lower boiling point coolant and the higher boiling point coolant when the air conditioner requires high cooling efficiency. The air conditioner separates the lower boiling point coolant from the higher boiling point coolant when the air conditioner does not require high cooling efficiency. In order to separate the lower boiling point coolant, the air conditioner has a rectifying circuit on which a controlling valve, a first pressure reducing means, a rectifying means, a second pressure reducing means and a heat exchanger is provided. The amount of coolant passing through the rectifying circuit is controlled in accordance with the temperature of the coolant downstream of the heat exchanger.

7 Claims, 8 Drawing Sheets

AUTOMOTIVE AIR CONDITIONER

FIELD OF THE INVENTION

The present invention relates to an automotive air conditioner, and especially to an air conditioner using a couple types of coolants, the boiling points of which are different from each other.

BACKGROUND OF THE INVENTION

The conventional types of automotive air conditioners have used a single type of coolant so that the contituent part of the coolant is constant at every portion in the refrigerant circuit. Therefore, the maximum cooling capacity of the air conditioner is calculated uniformly when the components of the refrigerant circuit (such as a compressor, a condenser, and an evaporator) are designed.

Since the compressor of the automotive air conditioner is driven by the automotive engine, the discharge faculty of the compressor is varied in accordance with the rotating speed of the automotive engine. Therefore, the other components, such as the condenser and the evaporator, should have a large enough capacity in order to insure the minimum cooling capacity of the automotive air conditioner even when the discharge faculty of the compressor is decreased.

The refrigerant circuit using a couple of types of coolant having different boiling points have been employed in heat-pumps for cooling and warming residential rooms. The refrigerant circuit of a heat-pump uses a couple types of coolant in order to increase the warming capacity when the temperature of the atmosphere is low. In other words, a couple types of of the coolant do not have any advantages when such coolant is used for cooling. Furthermore, since the compressor of the residential room air conditioner rotates constantly so that the discharge amount of the coolant is constant, and constitute parts of a couple types of of the coolant of the air conditioner do not require modulation over short periods, the room air conditioner of such refrigerant circuit uses a constituent parts rectifier having a very small capacity Therefore, the conventional
room air conditioner having a couple types of of the coolant requires more than ten hours for modulating the component parts of the coolant. The conventional type air conditioner, therefore, cannot be equipped within an automobile.

SUMMARY OF THE INVENTION

The object of the present invention is to provide automotive air conditioner using a couple types of of the coolant having different boiling points Another object of the present invention is to vary the refrigerant capacity of the automotive air conditioner by using a couple types of coolant.

A further object of the present invention is to increase the refrigerant capacity of the automotive air conditioner as required Therefore, the capacity of the automotive air conditioner of the present invention can be increased at the start of the operation. . The air conditioner of the present invention can also increase the capacity thereof when the discharge amount of the coolant from the compressor is small.

Still another object of the present invention is to modulate the constituent parts of the coolant.

In order to attain the above described objects, the air conditioner of the present invention has a compressor, a condenser, an expansion means and an evaporator in order to complete the refrigerant circuit. The automotive air conditioner of the present invention further has a rectifying circuit in which a first end is connected to the refrigerant circuit at a point between the condenser and the expansion means and another end is connected to the refrigerant circuit at a point between the evaporator and the compressor. The rectifying circuit comprises a controlling valve, a first pressure reducing means, a rectifying means, a second pressure reducing means, and a heat exchanger. The pressure reducing means of the rectifying circuit controls the amount of coolant passing through the rectifying circuit in accordance with the super heated degree of the coolant downstream of the heat exchanger. The rectifying means separate the coolant into two groups: a constituent portion of higher boiling point coolant and a portion of lower boiling coolant. The heat exchanger exchanges the heat between the two groups of coolant separated by the rectifying means. Therefore, the rectifying means seperates the coolant effectively in conjunction with the heat exchanger.

Since the amount of coolant passing through the rectifying circuit and the heat exchanger is controlled by the pressure reducing means in accordance with the super heated degree of the coolant downstream of the heat exchanger, the rectifying means and the heat exchanger can work effectively.

DETAILED DESCRIPTION OF THE PREFERRED EMBODIMENT

Figure 1:
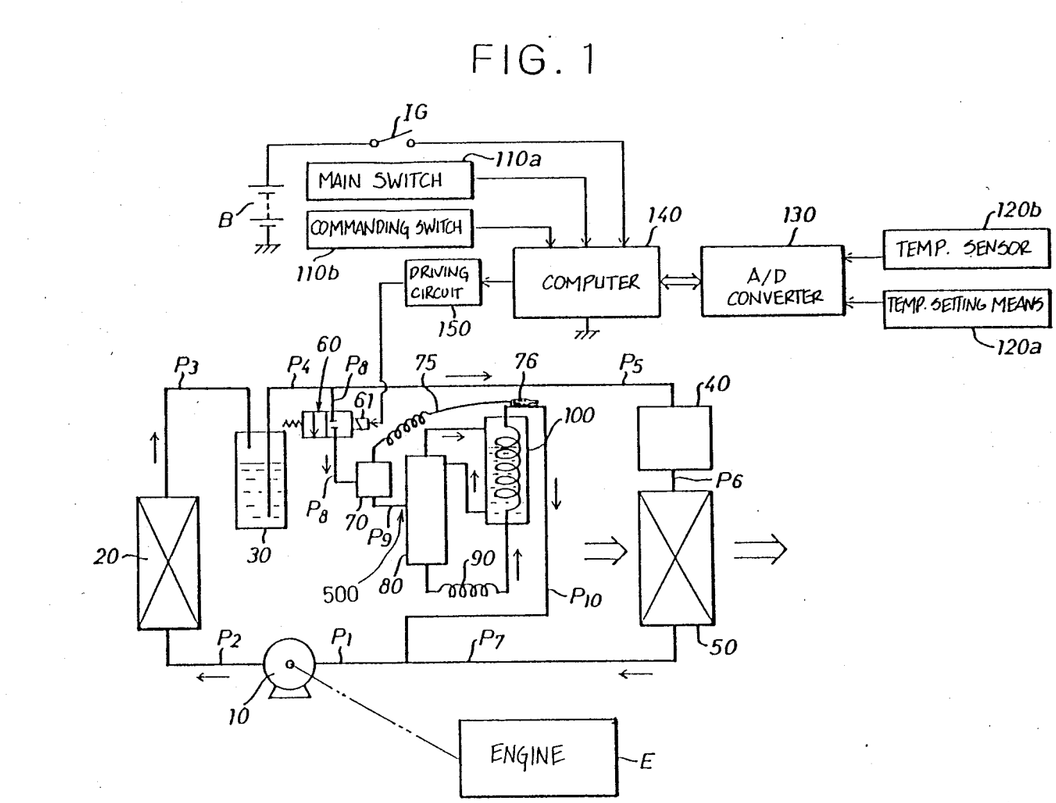
FIG. 1 is a schematic diagram of the refrigerant circuit of the present invention.

The refrigerant circuit shown in FIG. 1 uses a couple types of of the coolant, the boiling point of which are different from each other. The proportion of amount of a lower boiling point coolant and a higher boiling point coolant is varied in accordance with a desired cooling capacity. A compressor 10 is driven by an automotive engine E via a magnet clutch. The compressor 10 sacks the coolant from a coolant pass P1 and discharges the high pressurized coolant toward a coolant pipe P2. The coolant from the pipe P2 is condensed within a condenser by receiving a cooling air caused by a cooling fan (not shown). The condensed coolant is then introduced into a receiver 30 through a coolant pipe P3. The liquid phased coolant is then introduced into an expansion valve 40 via a pipe P4 and a pipe P5. The opening area of the expansion valve is varied in accordance with a super heated degree of the coolant downstream of an evaporator 50 for controlling the amount of the refrigerant into the evaporator 50. Air is cooled by the refrigerant while the air passes through the evaporator, so that the cooled air is then blown into the automotive compartment for air conditioning. The coolant evaporates while the coolant passes through the evaporator, 50 and the gas phased coolant is introduced into the pipe P1 through a pipe P7.

Figure 3:
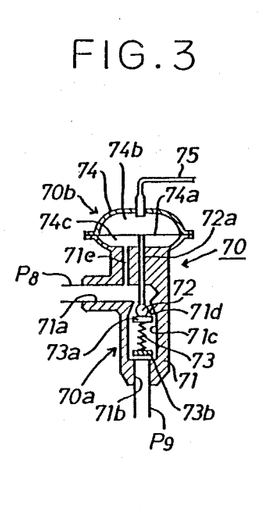
FIG. 3 is a sectional view of the first pressure reducing means shown in FIG. 1.

A rectifying circuit 500 is provided within the refrigerant circuit of the present invention. The rectifying circuit comprises a controlling valve 60 which opens and closes the rectifying circuit 500 in accordance with the excitement of a solenoid 61. A first pressure reducing means 70 is provided downstream of the controlling valve 60. The first pressure reducing means 70 has an expansion valve 70a and an actuator for actuating the expansion valve 70a (as shown in FIG. 3).

The expansion valve 70a has a value housing 71, an inlet port 71a connected to a pipe P8, and an outlet port 71b connected to a pipe P9. A cylindrical portion 71c is formed within a valve housing 71, and is connected to the inlet port 71a through a valve seat 71d, and to the outlet port 71b at a bottom portion thereof. A spherical valve body 72 is positioned within the cylindrical portion 71c and the valve body 72 is biased toward the valve seat 71d by receiving a biasing force of a coil spring 73 via a holding piece 73a. The valve body 72 is connected to a rod 72a which is positioned within the valve housing 71, in such a manner that the rod 72a can slid vertically 72a is connected to a diaphragm actuator 74. The opening degree of the valve body 72 is controlled by a biasing force of the coil spring 73 and the movement of the rod 72a. Therefore, the amount of the coolant passing from the pipe P8 to the pipe P9 is controlled by the expansion valve 70a. The numeral 73b shows an abutting piece which is fixed to an inner-surface of the cylindrical portion 71c.

The actuator 70b has the diaphragm actuator 74, a pressure introducing pipe 75 and a temperature detecting portion 76. The diaphragm actuater 74 is positioned at an upper side of the valve housing 71, and an upper chamber 74b and a lower chamber 74c are separated by a diaphragm 74a. The lower chamber 74c is connected to the inlet port 71a through a passage 71e which is formed within the valve housing 71. The diaphragm 74a is connected to the rod 72a so that the movement of the diaphragm 74a is transmitted to the rod 72a.

The temperature detecting portion 76 is positioned at on the outer surface of the pipe 10 which locates downstream of a heat excahger 100. A gas phased fluid volume which varies in accordance with temperature is contained within the temperature detecting portion 76. The pressure of the fluid within the temperature detecting portion 76 is introduced into the upper chamber 74b through the pressure introducing pipe 75. Accordingly, the opening degree of the expansion valve 70a is controlled in order to maintain the super heated degree of the coolant downstream of the heat exchanger 100.

Figure 2:
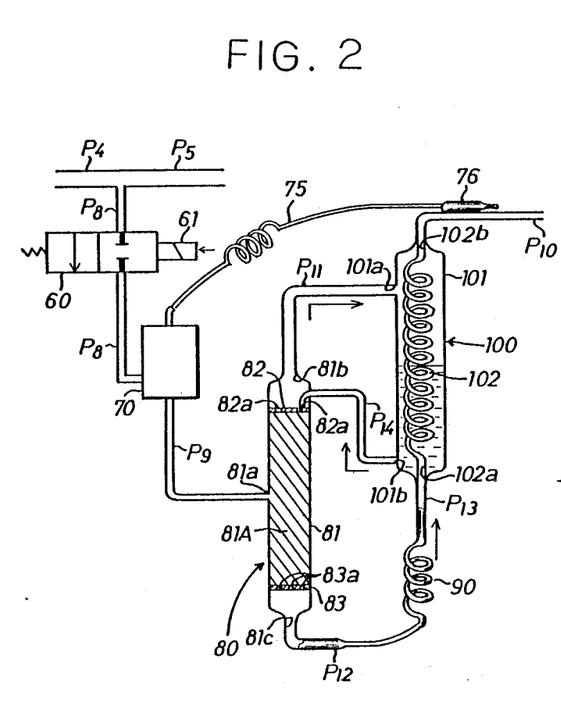
FIG. 2 is an enlarged view of a controlling valve, a first pressure reducing means, rectifying means and a heat exchanger shown in FIG. 1.

As shown in FIG. 2, rectifying means 80 has a cylindrical casing 81, and a content 81A which is stacked within a casing 81 and held by a couple of holding pieces 82 and 83. An inlet port 81a, which is positioned at a center portion of the casing 81, is connected to the pipe P9 and a first outlet port 81b which is formed at a top portion of the casing 81 is connected to the pipe P11. A second outlet port 81c which is formed at a bottom portion of the casing 81 is connected to the pipe P12.

The coolant introduced into the rectifying means 80 through the inlet port 81a is separated by the content 81A into a first group having a main constituting part of a lower boiling point coolant and a second group having a main constituting part of a higher boiling point coolant. The first coolant group flows toward the pipe P11 through a connecting hole 82a formed in the plate 82 and the first outlet port 81b, and the second coolant group flows toward the pipe P12 through a connecting hole 83a formed in the plate 83 and the second outlet port 81c. The content 81A of the present embodiment is a spring metal which can separate the higher boiling point coolant and the lower boiling point coolant effectively.

The second pressure reducing means 90 is positioned between the pipe P12 and a pipe P13 for expanding the second coolant group The second pressure reducing means 90 of the present embodiment is a capillary tube.

The heat exchanger 100 has a cylindrical case 101 and a spiral cooling column 102 positioned within the case 101. An inlet port 101a is connected to the pipe P11 and open at an upper portion of the case 101. An outlet port 101b is connected to the pipe P14 and open at a lower portion of the case 101. Thus, the heat exchanger 100 and a rectifying means 80 are connected by the pipes P11 and P14. The spiral cooling column 102 is connected to the pipe P13 at a bottom portion of the case 101, and to the pipe P10 at a top portion of the casing 101.

The coolant from the pipe P13 is evaporated while the coolant flows through the spiral cooling column 102. The first group coolant introduced from the pipe P11 is condensed within the case 101 and then returns to the rectifying means 80 through the outlet port 101b and the pipe P14. The connecting point at which the pipe P14 is connected to the casing 81 of the rectifying means 80 is located higher than the position of the outlet port 101b.

The electric circuit of the present embodiment is explained hereinafter.

A main switch 110a is turned "ON" when the operation of the air conditioner is required. A temperature setting means 120a outputs an electric signal relating to a desired temperature. A temperature sensor 120b detects the actual temperature in the automotive passenger's compartment. A-D converter 130 converts analogue signal from the temperature setting means 120a and the temperature sensor 120b to an digital signal. Numeral 110b shows a commanding switch which outputs a commanding signal to a computer 140 for controlling the operation of the air conditioner.

The computer 140 operates in accordance with the steps shown in a flow-chart (FIG. 4) for controlling a driving circuit 150 which is connected to the solenoid 61 of the controlling valve 60. The driving circuit 150 controls the excitement of the solenoid 61. The operation of the computer is programmed in ROM of the computer 140. The electric power of a battery B is supplied to the computer 140 through an ignition switch 1G.

The operation of the automotive air conditioner is explained hereinafter.

The compressor 10 starts to rotate by receiving the rotating power of the engine E through the magnet clutch when the main switch 110a turns "ON". The refrigerant is compressed by the compressor 10 and discharged toward the condenser 20. After condensed, the liquid phase coolant is introduced into the expansion valve 40 through the pipe P3, the receiver 30, the pipe P4 and the pipe P5. The low pressurized liquid phase coolant flows into the evaporator 50, and the coolant cools the air while flowing through the evaporator 50 so that the air flown into the automotive passenger's compartment is cooled.

Figure 4:
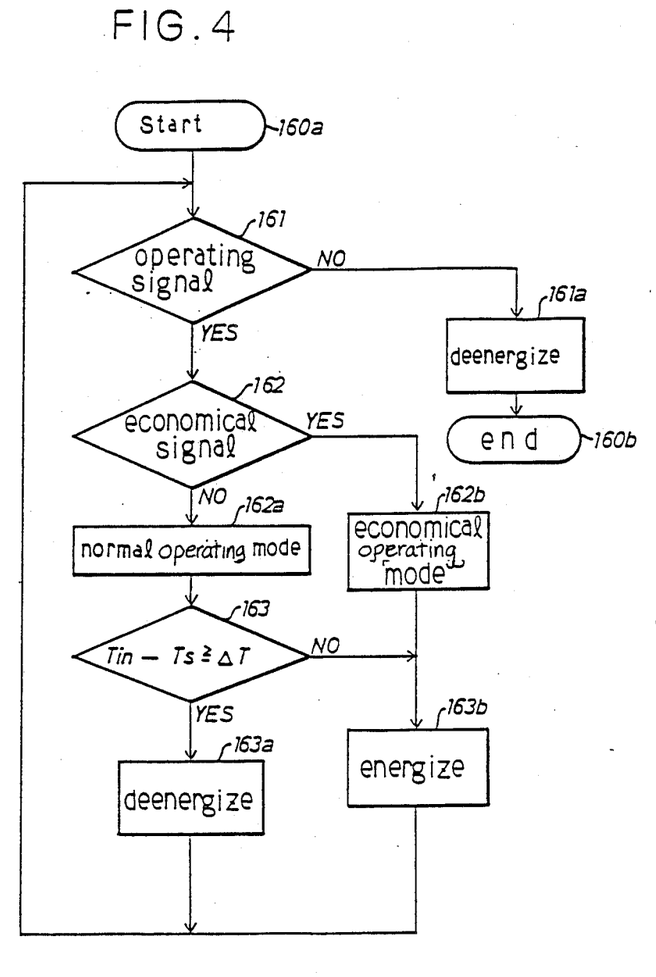
FIG. 4 is a flow-chart showing the operation of a micro computer shown in FIG. 1.

Meanwhile, the computer 140 starts to operate when the ignition switch 1G turns "ON" (a step 160a of FIG. 4). When the computer 140 receives the signal from the main switch 110a (step161), the computer 140 then compare whether the commanding switch 110b outputs an economical signal(step 162), in other words whether the air conditioner should operate under an economical mode. If the computer determines "NO" at the step 162, the computer 140 makes the air conditioner operate under the normal operation(step 162a). And if the computer determines "YES" at the step 162, then computer 140 makes the air conditioner operate under the economical operating mode (step 162b).

The computer 140 then calculates whether the signal from the A-D converter 130, which indicates the difference between the output signal from the temperature sensor 120b (Tin) and the output signal from the temperature setting means 120a(Ts), is greater than the predetermined value T (step 163). If the computer 140 determines "YES", no current is supplied to the solenoid 61(163a). The mode "YES", which means the condition that the difference Tin−Ts is larger than the predetermined value T, represents a capacity shortage condition of the air conditioner. When the mode is "NO", namely when Tin−Ts is smaller than T, the capacity of the air conditioner satisfies with the requirement.

The liquid phase coolant held in the heat exchanger 100 is sucked toward the compressor 10 through the outlet port 101b, the pipe P14, the rectifying means 80, the pipe P12, the second pressure reducing means 90, the pipe P13, the spiral cooling column 102 within the heat exchanger 100, the pipe P10 and the pipe P1. The first group coolant having a main constituent part of lower boiling point coolant and the second group coolant having a main constituent part of higher boiling point coolant are mixed, and the mixed coolant flows through the circuit of the compressor 10, the condenser 20, the receiver 30, the expansion valve 40 and evaporator 50.

Since the cooling capacity of the air conditioner using both types of the coolant is greater than that of the air conditioner only using the second group of coolant, the air conditioner can cool the automotive compartment effectively. In other words, the first group coolant is valuable to increase the cooling capacity of the air conditioner. The first group coolant, however, has a disadvantage that the compressor 10 needs much energy for compressing the coolant.

When the computer 140 determines "NO" mode at the step 163, the computer 140 outputs the electric signal toward the solenoid 61 for opening the controlling valve 60(step 163b). Since the first group of coolant is stocked within the heat exchanger 100 when the rectifying circuit is opened, namely when the control valve 60 is opened, "NO" mode means the normal air conditioning operation.

A part of coolant passing through the pipe P4 is introduced into the rectifying circuit when the control valve 60 opens the circuit. Since the opening area of the expansion valve 70a of the first pressure reducing means 70 is controlled by the actuator 70b, the amount of coolant passing through the rectifying circuit is controlled. Thus, the controlled amount of coolant is introduced into the rectifying means 80 and the coolant is separated into the first group coolant having a main constituent part of lower boiling point coolant and the second group coolant the main constituent part of which is the higher boiling point coolant by the content 81A.

The second group coolant flows down to the pipe P12 through the connecting hole 83a formed in the plate 83. The coolant flowing through the pipe P12 is then introduced into the second pressure reducing means 90 so that the low pressurized liquid phase coolant is introduced into the spiral cooling column 102 through the pipe P13. The second group coolant passing through the spiral cooling column 102 cools the first group coolant stocked within the heat exchanger 100 while the coolant within the spiral cooling column 102 evaporates. The first group coolant flows up to the pipe P11 through the connecting hole 82a formed in the plate 82. The gas first group coolant is then introduced into the casing 101 of the heat exchanger 100 through the inlet hole 101a. The first group coolant introduced into the casing 101 is condensed so that the liquid phase coolant is held in the casing 101.

A part of the second group coolant stacked in the casing 101 flows toward the upper portion of the rectifying means 80 through the output port 101b and the pipe P14. The liquid phase second group coolant introduced into the rectifying means 80 flows to the continent 81A through the connecting hole 82a of the plate 82, so that the liquid phase second group coolant introduced from the pipe P14 is contacted with the gas phase of first group coolant within the rectifying means 80. Accordingly, the gas phased first group coolant is cooled by the liquid phase second group coolant in order to separate the constituent part of the higher boiling point coolant from the first group coolant. Consequently, the proportion of lower boiling point coolant to higher boiling point coolant within the first group coolant becomes higher.

Figure 5:
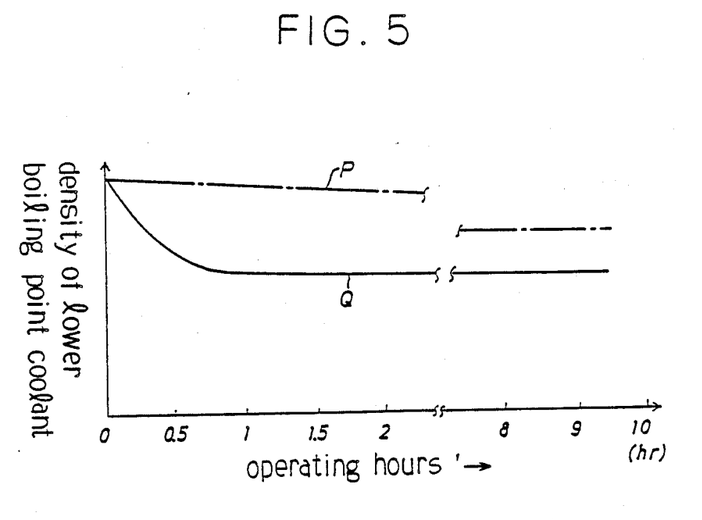
FIG. 5 shows the relationship between constituent part of the coolant and the operating hours of the rectifying circuit.

As described above, the first group coolant is stocked within the heat exchanger 100 when the controlling valve 60 is opened, so that the second group of coolant circulates through the compressor 10, the condenser 20, the expansion valve 40 and the evaporator 50. Accordingly the cooling capacity of the air conditioner is decreased when the controlling valve 60 opens the circuit. Since the rectifying circuit of the present invention employs the rectifying means 80 and the heat exchanger 100, and since the pressure of the coolant introduced into the rectifying means 80 and the heat exchanger 100 is reduced by the first pressure reducing means 70 and the second pressure reducing means 90 respectively, the first group coolant is separated from the second group coolant in a short period. Furthermore, since the heat exchanger 100 uses the heat of the coolant passing through the heat exchanger 100 effectively, the volume of the rectifying means of the present embodiment FIG. 5 shows the effect of the present embodiment. The co-ordinate of FIG. 5 is the operating hours and the ordinate of FIG. 5 is the percentage of the consistent part of the lower boiling point coolant. The solid line Q represents the test data of the present embodiment, the dotted line P represents the test data of the air conditioner having a rectifying means but not a heat exchanger. As clearly shown from FIG. 5, the rectifying circuit having both the rectifying means 80 and the heat exchanger 100 separates the first group of coolant more quickly. the economy switch 110b, the computer 140 chooses the economical operating modes (steps 162, 162b). The solenoid 61 of the controlling valve 60 is energized when the operation of the air conditioner is the economy operating mode (step 163b).

When the main switch 110a is turned "OFF", the computer 140 commands the solenoid 61 to deenergize to close the controlling valve 60, and then the operation of the computer 140 is ended.

Figure 6:
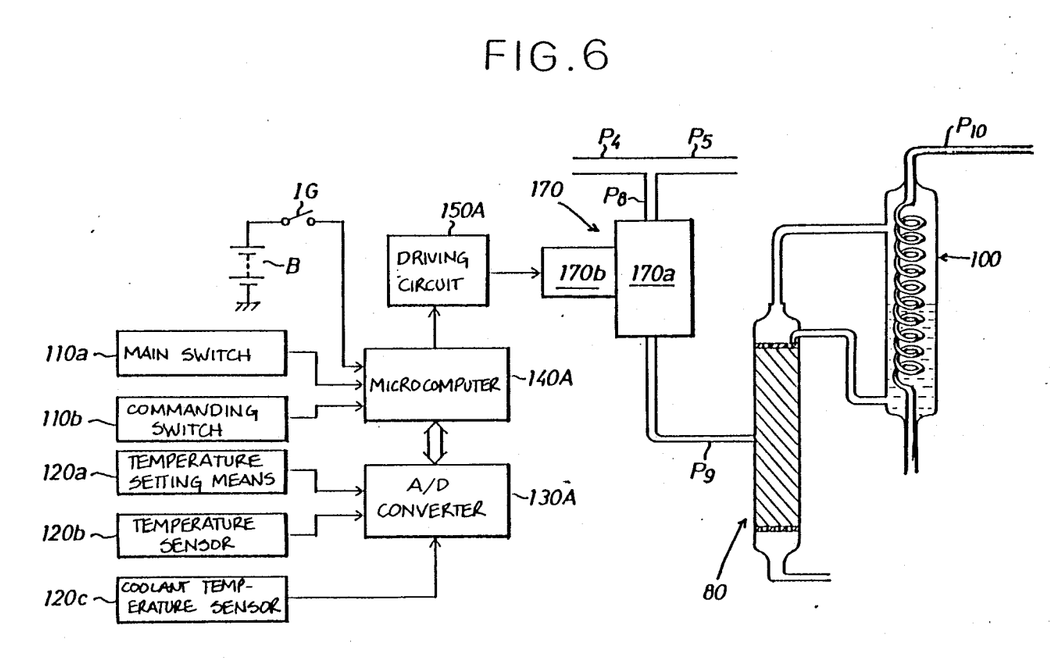
FIG. 6 is a schematic diagram showing a part of another embodiment of the present invention.
Figure 7:
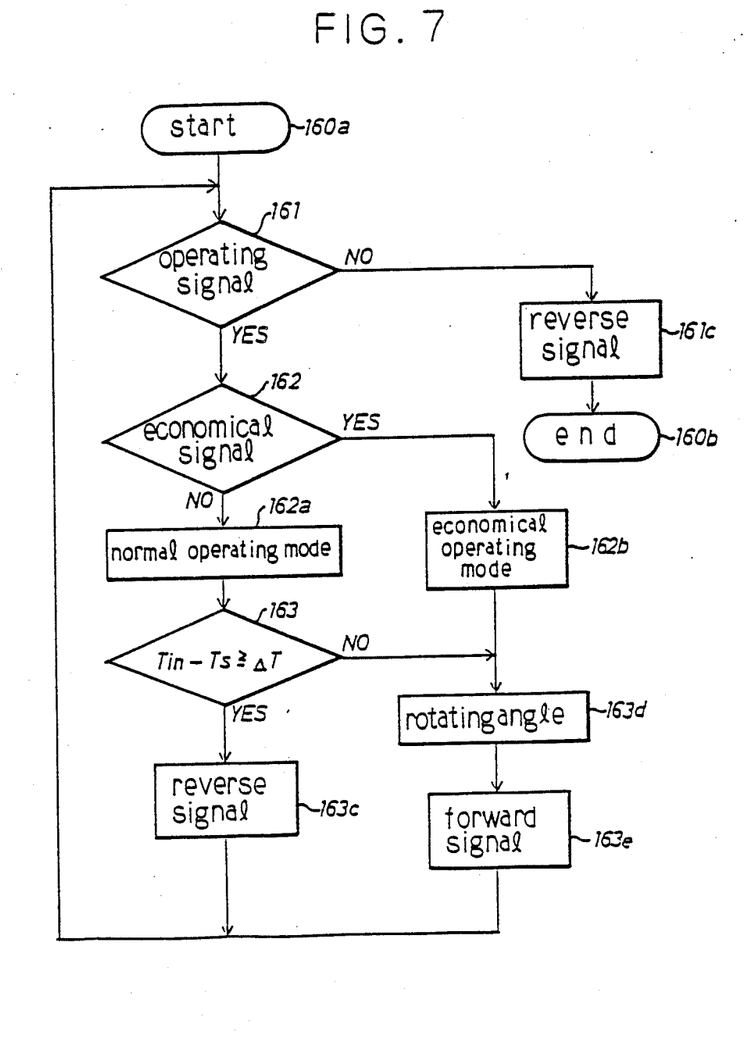
FIG. 7 is a flow-chart showing the operation of a micro computer shown in FIG. 6.

FIG. 6 shows another embodiment of the rectifying circuit. The rectifying circuit of the embodiment shown in FIG. 6 employs a controlling means 170 which has both characteristics of the controlling valve 60 and the first pressure reducing means 70 according to the former embodiment shown in FIG. 1. The controlling means 170 has a controlling valve 170a and a motor 170b which actuates the valve 170a. The valve 170a controls the amount of coolant passing through toward the pipe P9 in accordance with the opening degree thereof. A coolant temperature sensor 120c detects the temperature of the coolant within the pipe P10, and the microcomputer 140A operates under a commanding order shown in the flow-chart of FIG. 7. The flow-chart shown in FIG. 7 is slightly modified from the flow-chart shown in FIG. 4, and is preliminary memorized within the ROM of the computer 140A. The driving circuit 150A controls the rotating angle of the motor 170b in order to control the opening area of the valve 170a. Namely, the opening area of the valve 170b is varied in accordance with the rotating degree of the motor 170b.

As shown in the flow-chart of FIG. 7, the computer 140A outputs an electric signal to the driving circuit 150A for rotating the motor 170b in order to shut the valve 170a when the computer 140A chooses a "YES" mode at step 163. Consequently, the first group coolant within the heat exchanger 100 flows toward the pipe P1 for mixing the first group coolant and the second group coolant. So that the cooling ability of the air conditioner can be improved and the automotive passenger's compartment is cooled quickly.

When the computer 140A chooses a "NO" mode at step 163, the computer 140A then determines the preferred degree of the motor (step 163d). The computer 140A thereby outputs the electric signal to the driving circuit 150A for rotating the motor 170b in order to adapt the opening area of the valve 170a to the desired degree calculated by the computer 140A.

The first group coolant is contained within the heat exchanger 100 when the valve 170a is opened, so that the coolant circulating the compressor 10, the condenser 20, the expansion valve 40 and the evaporator 50 becomes the second group coolant thereby reducing the required energy of the compressor.

Since the opening area of the valve 170a is controlled in accordance with the temperature of the coolant in the pipe P10, the amount of the coolant flowing to the rectifying means 80 is controlled effectively. Accordingly the rectifying means 80 and the heat exchanger 100 separates the first type coolant from the second type coolant quickly.

When the computer 140A chooses a "NO" mode at step 161, the computer 140A outputs an electric signal to the driving circuit 150A to close the valve 170b (step 161c).

Figure 8:
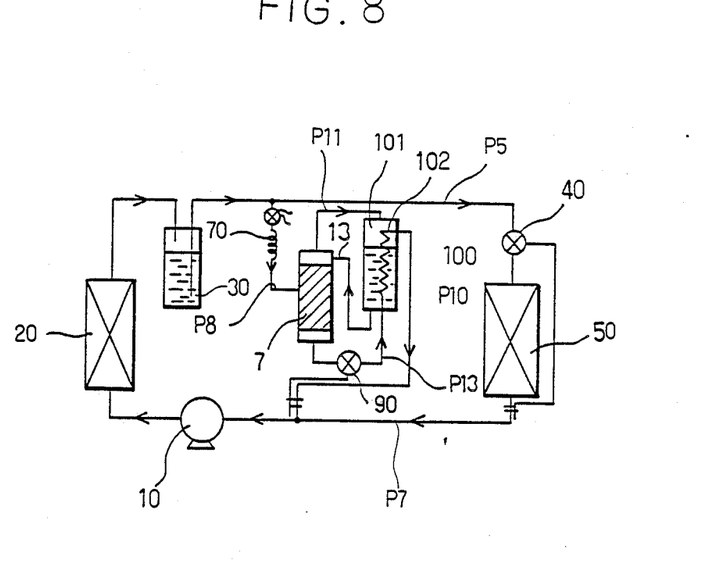
FIG. 8 is a schematic diagram of still another other embodiment of the present invention.

FIG. 8 shows another embodiment of the present invention. The embodiment shown in FIG. 8 has a capillary tube as the first pressure reducing means 70. Namely, the first pressure reducing means 70 of this embodiment can not control the opening area thereof in accordance with the super heated degree of the coolant in the pipe P10.

The embodiment shown in FIG. 8, on the other hand, employs in the second pressure reducing means 90 an expansion valve in which the opening area is varied in accordance with the super heated degree of the coolant in the pipe P10. Therefore, that the amount of the coolant flowing through the rectifying circuit can be controlled by the second pressure reducing means 90. The amount of the coolant passing through the rectifying circuit can be maintained even though the rotating speed of the compressor 10 is varied or the cooling load required by the air conditioner is varied. Accordingly, the liquid phase coolant is prevented from over-flowing the rectifying means 80.

The super heated degree of the coolant in the pipe P10 in this embodiment is controlled as 10°–15° C. Therefore, the liquid phase coolant is prevented from being introduced into the compressor 10. The expansion valve used as the second pressure reducing means 90 of this embodiment has the similar structure as the first pressure reducing means 70 described in FIG. 3.

The embodiments described above have the receiver 30 so that liquid phase coolant is introduced into the rectifying circuit. Since the coolant is separated into the gas phased coolant and liquid phased coolant in the receiver 30, and since the constituent part of the liquid phased coolant is different from that of the gas phased coolant, the receiver 30 has a separating function for separating the first group coolant from the second group coolant. Therefore, the rectifying circuit of these embodiments works effectively in association with the receiver 30. However, it should be noted that a refrigerant circuit having no receiver 30 can also be used as the present invention. An accumulator positioned between the evaporator 50 and the compressor 10 can be used instead of the receiver 30.

Figure 9:
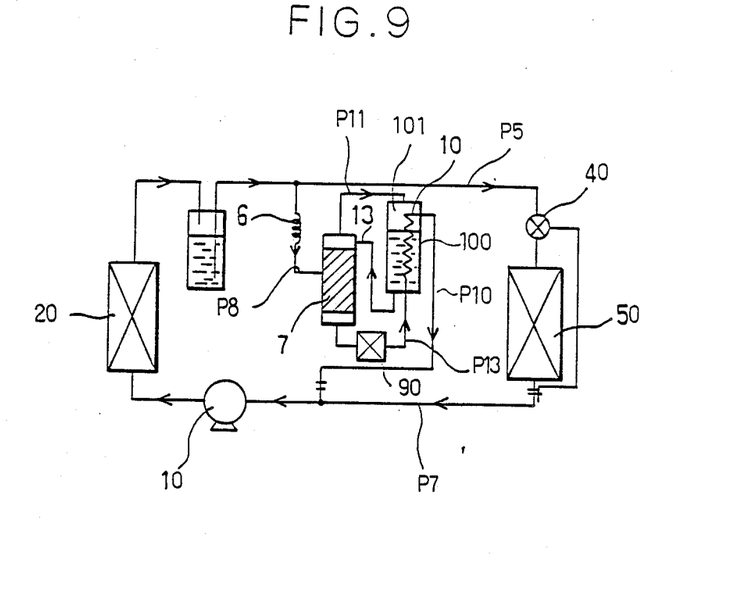
FIG. 9 is a schematic diagram of still another embodiment of the present invention.

FIG. 9 shows another embodiment which has an electric controlled valve as the second pressure reducing means 90. The valve 90 of this embodiment has a similar structure as the first pressure reducing means 170a shown in FIG. 6. Therefore, the valve 90 of this embodiment works as the second pressure reducing means 90 and as the controlling valve 60 (as shown in FIG. 1). No coolant passes through the rectifying circuit when the valve 90 shuts off the pipe P13. The amount of coolant passing through the rectifying circuit is controlled by the valve 90 in accordance with the super heated degree of the coolant in the pipe P10.

What is claimed is:

1. An automotive air conditioner comprising:
   a compressor for compressing a coolant containing a plurality of groups of coolant having different boiling points,
   a condenser for condensing the coolant discharged from said compressor,
   an expansion means for expanding the coolant condensed in said condenser, an evaporator for evaporating the coolant from said expansion means, and a rectifying circuit in which a first end thereof is connected to a portion between said condenser and said expansion means and a second end thereof is connected to a portion between said evaporator and said compressor, wherein said rectifying circuit comprises:

a controlling valve for controlling whether the coolant flows through said rectifying circuit, a first pressure reducing means for reducing a pressure of the coolant introduced into said rectifying circuit, a rectifying means for rectifying the coolant introduced from said first pressure reducing means, a second pressure reducing means for reducing a pressure of a liquid phased coolant rectified by said rectifying means, a heat exchanger for exchanging heat between the coolant introduced from said second pressure reducing means and a gas phased coolant rectified by said rectifying means, and an opening area of at least one of said first pressure reducing means and said second pressure reducing means is varied in accordance with a condition of coolant downstream of said heat exchanger for controlling an amount of the cooling passing through said rectifying means.

2. An automotive air conditioner claimed in claim 1, further comprising:

a receiver provided between said condenser and the first end of said rectifying circuit for receiving the coolant and separating the coolant to the liquid phased coolant and the gas phased coolant.

3. An automotive air conditioner claimed in claim 1, wherein:

said first pressure reducing means is an expansion valve for expanding the coolant in accordance with a super heated degree of the coolant downstream of said heat exchanger, and said second pressure reducing means is a capillary tube.

4. An automotive air conditioner claimed in claim 1, wherein:

said first pressure reducing means is an electrically controlled valve the opening area thereof is controlled in accordance with an electric signal, and said electrically controlled valve also works as said controlling valve.

5. An automotive air conditioner claimed in claim 1, wherein:

said first pressure reducing means is a capillary tube, and said second pressure reducing means is an expansion valve in which an opening area thereof is varied in accordance with a super heated degree of the coolant downstream of said heat exchanger.

6. An automotive air conditioner claimed in claim 1, wherein:

said second pressure reducing means is an electrically controlled valve in which an opening area thereof is varied in accordance with an electric signal, and said electrically controlled valve also works as said controlling valve.

7. An automotive air conditioner comprising:

a compressor for compressing a coolant containing a plurality of groups of coolant having different boiling points, a condenser for condensing the coolant discharged from said compressor, an expansion means for expanding the coolant condensed in said condenser, an evaporator for evaporating the coolant from said expansion means, and a rectifying circuit in which a first end thereof is connected to a portion between said condensed and said expansion means and a second end thereof is connected to a portion between said evaporator and said compressor, said rectifying circuit comprising :

a first pressure reducing means for reducing a pressure of the coolant introduced into said rectifying circuit, a rectifying means for rectifying the coolant to a first group coolant and a second group coolant, a second pressure reducing means for reducing a pressure of a first group coolant rectified in said rectifying means, and a heat exchanger for exchanging heat between the first group coolant introduced from said second pressure reducing means and a second group coolant rectified by said rectifying means, wherein an amount of the coolant passing through said rectifying circuit is controlled by at least one of said first pressure reducing means and said second pressure reducing means in accordance with a condition of the coolant in said rectifying circuit.

* * * * *